United States Patent
Saunders

(10) Patent No.: US 6,738,364 B1
(45) Date of Patent: May 18, 2004

(54) RADIO RECEIVERS AND METHODS OF OPERATION

(75) Inventor: Robert Stanley Saunders, London (GB)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/419,969

(22) Filed: Oct. 18, 1999

Related U.S. Application Data

(63) Continuation of application No. 08/784,974, filed on Jan. 17, 1997, now Pat. No. 5,991,283.

(30) Foreign Application Priority Data

Jan. 31, 1996 (GB) .............................................. 9601987

(51) Int. Cl.[7] ............................. H04B 7/212; H04J 3/06; H04Q 7/00
(52) U.S. Cl. ....................... 370/332; 370/337; 370/347; 370/350; 370/509; 370/520; 375/347; 375/362; 455/67.3; 455/226.2; 455/502
(58) Field of Search ................................ 370/329, 331, 370/332, 336, 337, 345, 347, 350, 503, 509, 520; 375/347, 355, 362, 364, 365; 455/450, 500, 501, 502, 63, 67.1, 67.3, 134, 135, 161.2, 161.3, 226.1, 226.2, 226.3, 277.2

(56) References Cited

U.S. PATENT DOCUMENTS

| | | | |
|---|---|---|---|
| 5,052,026 A | * 9/1991 | Wallley | 375/119 |
| 5,054,035 A | 10/1991 | Tarallo et al. | 375/10 |
| 5,150,362 A | 9/1992 | Akerberg | 370/95.1 |
| 5,200,956 A | 4/1993 | Pudney et al. | 370/95.1 |
| 5,214,687 A | 5/1993 | Kansakoski et al. | 379/60 |
| 5,258,981 A | 11/1993 | Davey et al. | 370/95.1 |
| 5,276,691 A | 1/1994 | Kivari | 371/47.1 |
| 5,390,340 A | * 2/1995 | Kondo | 455/38.1 |
| 5,396,496 A | 3/1995 | Ito et al. | 370/50 |
| 5,416,778 A | 5/1995 | Chan et al. | 370/95.1 |
| 5,446,922 A | * 8/1995 | Siwiak et al. | 455/277.2 |
| 5,488,638 A | * 1/1996 | Kazecki et al. | 375/347 |
| 5,535,429 A | * 7/1996 | Bergenlid et al. | 455/53.1 |
| 5,598,407 A | 1/1997 | Bud et al. | 370/330 |
| 5,960,046 A | * 9/1999 | Morris et al. | 375/347 |
| 5,991,283 A | * 11/1999 | Saunders | 370/333 |
| 6,032,033 A | * 2/2000 | Morris et al. | 455/277.2 |
| 6,091,718 A | * 7/2000 | Saunders et al. | 370/331 |
| 6,256,477 B1 | * 7/2001 | Eidson et al. | 455/63 |

FOREIGN PATENT DOCUMENTS

| | | |
|---|---|---|
| EP | 0 472 511 A2 | 2/1992 |
| GB | 2 297 013 | 7/1996 |
| GB | 2 297 014 | 7/1996 |
| JP | 02206926 A | 8/1990 |

OTHER PUBLICATIONS

Patent Abstracts of Japan, Publication No.: 02206926 A Ref. No. 1.

Japanese Patent Application Public Disclosure No. 49–84101, Frequency Switching Control Circuit, H. Hara et al., Dec. 15, 1972.

* cited by examiner

Primary Examiner—Alpus H. Hsu
(74) Attorney, Agent, or Firm—Perman & Green, LLP

(57) ABSTRACT

A radio receiver in which the length of time that it takes to synchronize with a burst to be received is used as a measure of the quality of the channel over which the burst is transmitted.

15 Claims, 8 Drawing Sheets

R-CRC: IS A 16 BIT CRC STORED IN BITS a48 - a63 CARRIED OUT ON THE 48 OTHER BITS IN THE A-FIELD a0 - a47

X-CRC IS A 4 BIT CRC STORED IN BITS b320 - b323 CARRIED OUT ON THE LAST 16 BITS OF EACH B-SUBFIELD, THE 80 BITS THAT ARE:

b48 – b63
b112 – b127
b176 – b191
b240 – b255
b304 – b323

Z-FIELD BITS: ARE A REPEAT OF THE X-CRC BITS

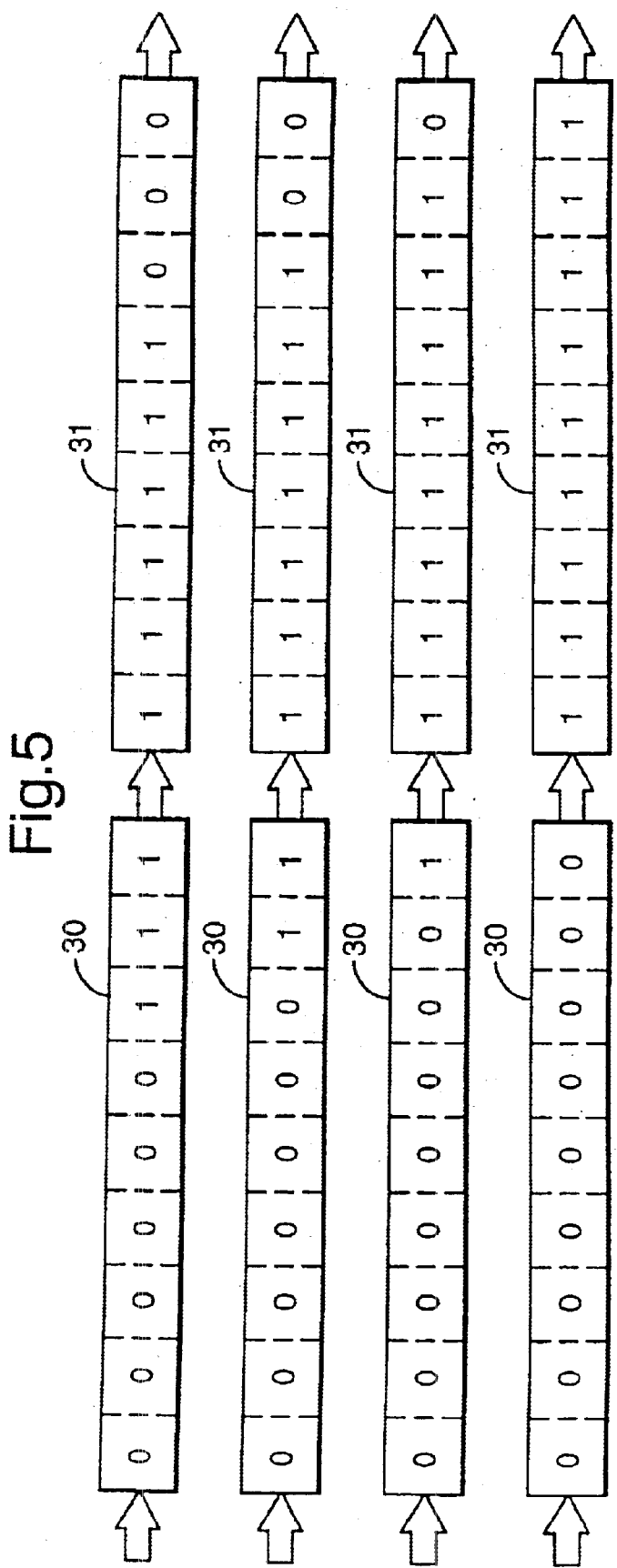

RADIO RECEIVERS AND METHODS OF OPERATION

CROSS REFERENCE TO RELATED APPLICATIONS

This application is a continuation of application Ser. No. 08/784,974, filed on Jan. 17, 1997, now U.S. Pat. No. 5,991,283.

BACKGROUND OF THE INVENTION

This invention relates to radio receivers, and particularly but not exclusively to such receivers forming part of the transceiver of a portable radio telephone or handset, for communication with a base station in a radio telephone system. The invention also relates to a method of operation of such radio receivers. The invention also relates, particularly but not exclusively, to handsets for communication with base stations in a digital cellular radio telephone system employing transmission by a plurality of carrier frequencies in frames, such as TDMA frames, each consisting of a predetermined number of time slots.

Any radio system in which information is transmitted in bursts causes problems for the receiving station in maintaining synchronicity with the signals received. Many protocols provide for a solution to this problem by including a synchronisation field at the start of a burst to allow the receiving station to synchronise with the signal before signals carrying data or other information are received.

In digital systems the receiver must achieve both 'lock recovery' or bit synchronisation with the incoming signal allowing data to be recovered, and slot, or burst, synchronisation that allows the receiver to determine which point of a burst is being received. For this purpose, a synchronisation field comprising a known string of bits is provided at the beginning of each burst so that the receiving station can correlate its timing to that of the incoming signal. The known string allows bit synchronisation to be achieved relatively quickly in good conditions ie when the signal is of a high quality. The bit synchronisation field must, however, be long enough for bit synchronisation to be achieved under all the circumstances in which the signal quality is suitable to provide information. Following the bit synchronisation string is typically a slot synchronisation string that allows the receiving station to locate a particular point in the burst so that the category or type of information carried by the subsequently received bits of that burst can be identified by virtue of their position within the burst.

Signalling protocols typically provide for error detection so that good data received can be distinguished from corrupt data. The quality of a channel for receiving signals can be monitored to determine if a new channel is necessary in order to preserve transfer of the information carried by the signal bursts from the base station to the handset or vice versa. It is desirable to monitor channel quality to allow a better quality channel to be used before too much information is lost. The quality of a received signal can be used as a trigger for changing channel.

SUMMARY OF THE INVENTION

In accordance with the present invention there is provided a radio receiver for communication in a radio system in which information is transmitted in bursts, a burst having a field for enabling the radio receiver to synchronise with an incoming signal, the radio receiver comprising processing means operable to utilise the interval for the achievement of synchronisation as a measure of signal quality.

Because a synchronisation field is typically long enough to enable synchronisation to be achieved when signal quality is less than perfect, there is some redundancy built into the signal ie it is longer than necessary for synchronisation under good conditions. This provides scope for the receiver to use information on the interval for achieving synchronisation to provide information on signal quality.

This information can be used instead of, or as well as, other signal quality information that can be obtained. The advantage of using the synchronisation field to measure signal quality is that a decision to change channels may be made before any data is lost.

When used in accordance with the present invention, the synchronisation field is particularly useful in detecting sliding collisions that may cause the loss of information at the front end of a data burst. Sliding collisions can arise when systems having overlapping spheres of influence operate under the same protocol. This is because a burst in a time slot on one system may occur at a similar time as a burst in a time slot of another system. When the two systems are unsynchronised, the timing of one system will inevitably drift relative to the other, causing the interference pattern to differ with time. A pair of bearer channels utilised on respective systems can, therefore, 'slide' in and out of interference with one another over a period of time. This type of interference is known as a 'sliding collision'.

Because there are typically bounds imposed on the accuracy of timing in respective systems, data loss as a result of a sliding collision will increase relatively slowly over a number of bursts. This allows, if desirable, a number of bursts to be used to determine if a sliding collision is occurring whilst still providing the opportunity to change channel on such a determination before a significant amount of information carried by a burst is lost.

In accordance with a second aspect of the invention there is provided a method for providing a measure of signal quality in a radio telephone system in which information is transmitted in bursts, a burst having a synchronisation field for enabling synchronisation with an incoming signal, the method comprising utilising the interval for achievement of synchronisation as a measure of signal quality.

BRIEF DESCRIPTION OF THE DRAWINGS

The invention will be described in more detail with reference to the accompanying drawings of which:

FIG. 4 is a schematic representation of the S-field of the burst of FIG. 3;

FIG. 5 is a schematic representation of a method of gaining lock recovery utilising the S-field of FIG. 4;

DETAILED DESCRIPTION OF THE INVENTION

Figure 1:
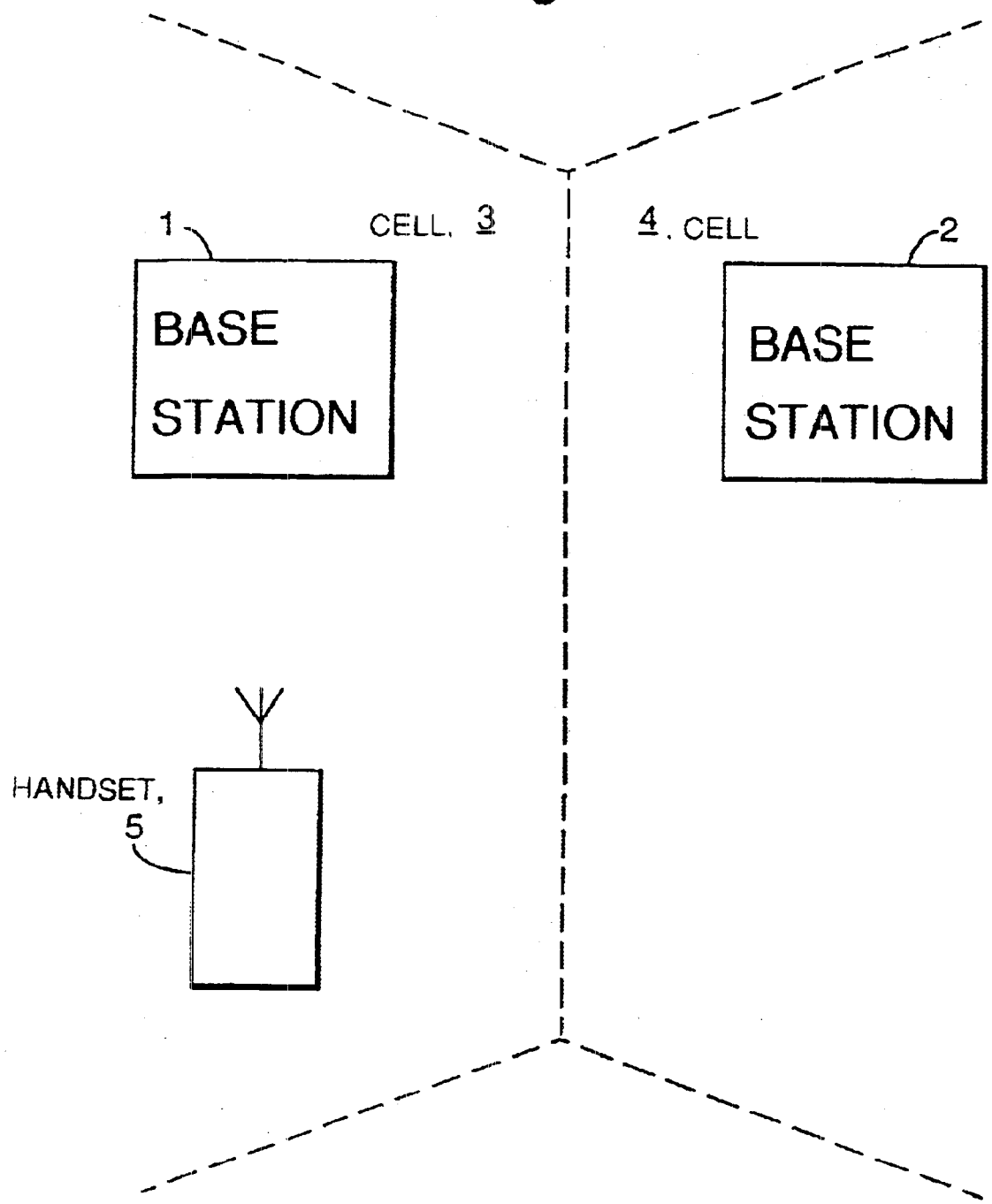
FIG. 1 is a schematic representation a radio telephone system suitable for utilising the present invention.

In the described example shown in the drawings, the radio telephone system conforms to the DECT (Digital European Cordless Telecommunications) standard and uses ten carrier frequencies, separated by 1.728 MHz, within a frequency band from 1880 MHz to 1900 MHz. This system divides time into TDMA frames, with each frame having a time duration of 10 ms. Each frame is divided into 24 time slots, numbered from 0 to 23. Each frame is divided into two halves, the first half (slots 0 to 11) being reserved for the transmission of the base station and the second half (slots 12 to 23) being reserved for the transmission of the handset.

A DECT system typically includes one or more fixed parts and several radio fixed parts or base stations 1, 2 supporting respective cells 3, 4. Many portable parts or handsets 5 can use each cell. Each fixed part is physically connected to a standard wireline telephone system, each radio fixed part 1, 2 of a common system is physically connected to the fixed part.

Figure 2:
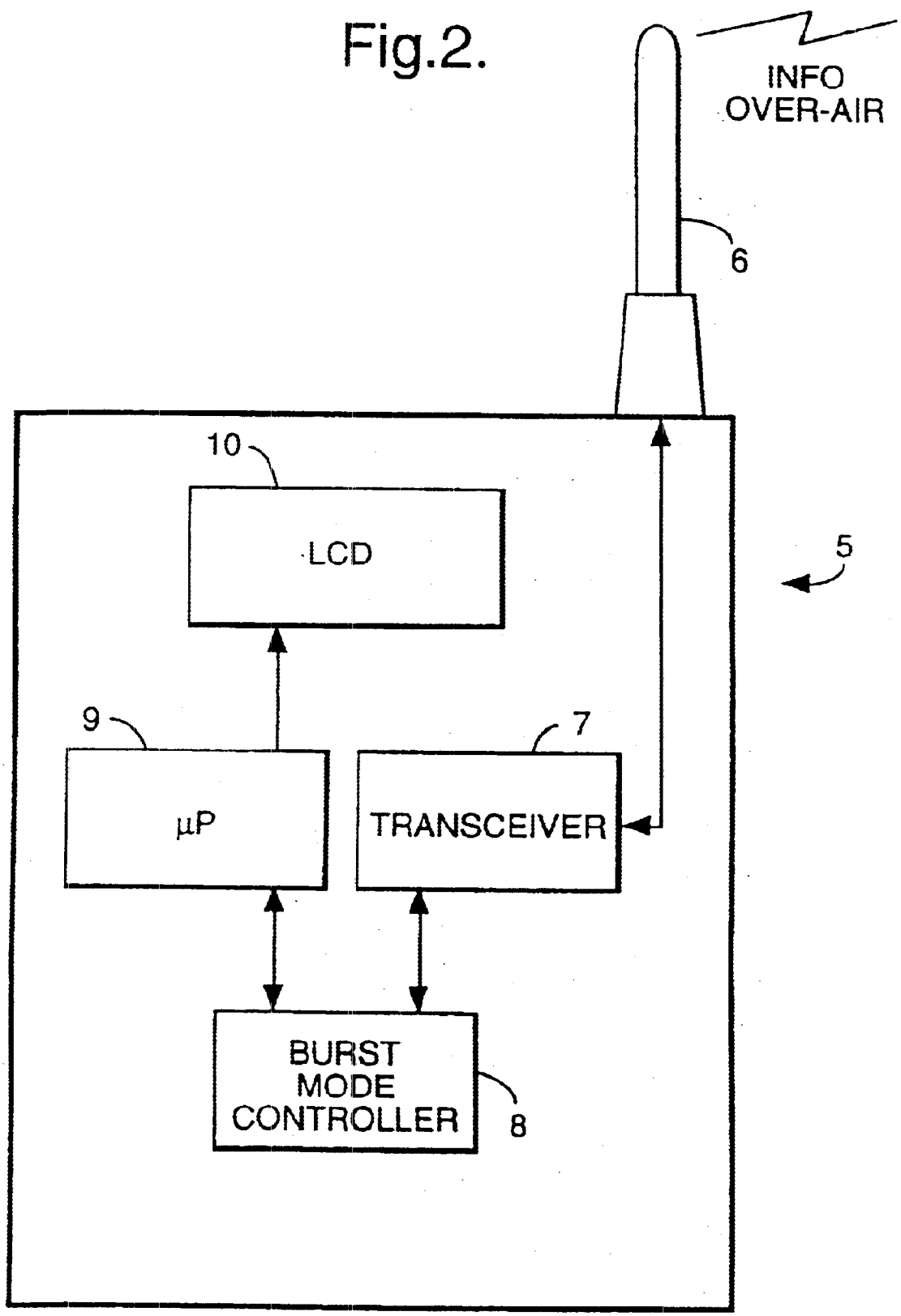
FIG. 2 is a schematic representation of a handset in accordance with the present invention.

Each handset 5 has an antenna 6, a transceiver 7, a burst mode controller 8 and processing means 9 programmed with algorithms controlling communication with a base station over a communication channel. Information is displayed on a Liquid Crystal Display (LCD) 10. (FIG. 2)

Figure 3:
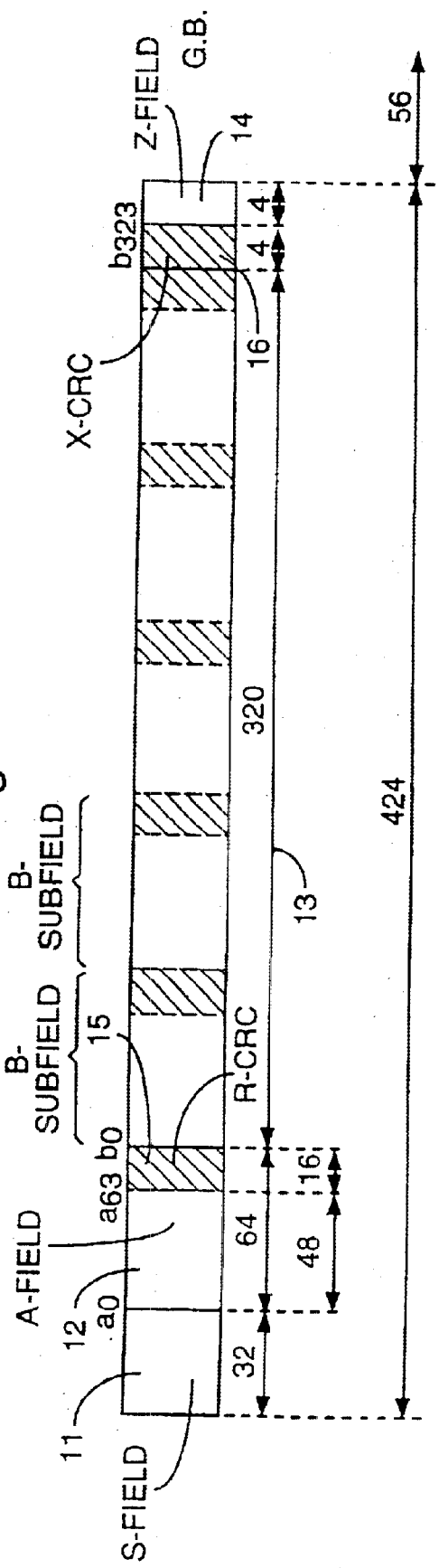
FIG. 3 is a schematic representation of a signal burst of a signal protocol.

Transmission in one of the time slots of a frame is accomplished by sending a signal burst. Each signal burst is divided into four fields and its structure is illustrated in FIG. 3. The S-field 11 used for synchronisation, and the A-field 12, used to send signalling information in accordance with the DECT protocol are both used when locking on i.e. finding a channel (a combination of carrier frequency and time slot) for receiving system information. The B-field 13 is used for sending speech or data to a system user and the Z-field 14 is provided specifically for sliding error detection. In addition to the Z-field, the A and B fields have their own error detection sub-fields known as Cyclic Redundancy Checks (CRCs) R-CRC 15 and X-CRC 16 respectively. The A-field is 64 bits long with the final 16 bits, the R-CRC 15, providing an error check on the preceding 48 bits. The B-field is 320 bits. The 4 bit X-CRC 16 provides an error check on the B-field. The Z-field 14 is a repetition of the X-CRC 16.

Figures 4A, 4B:
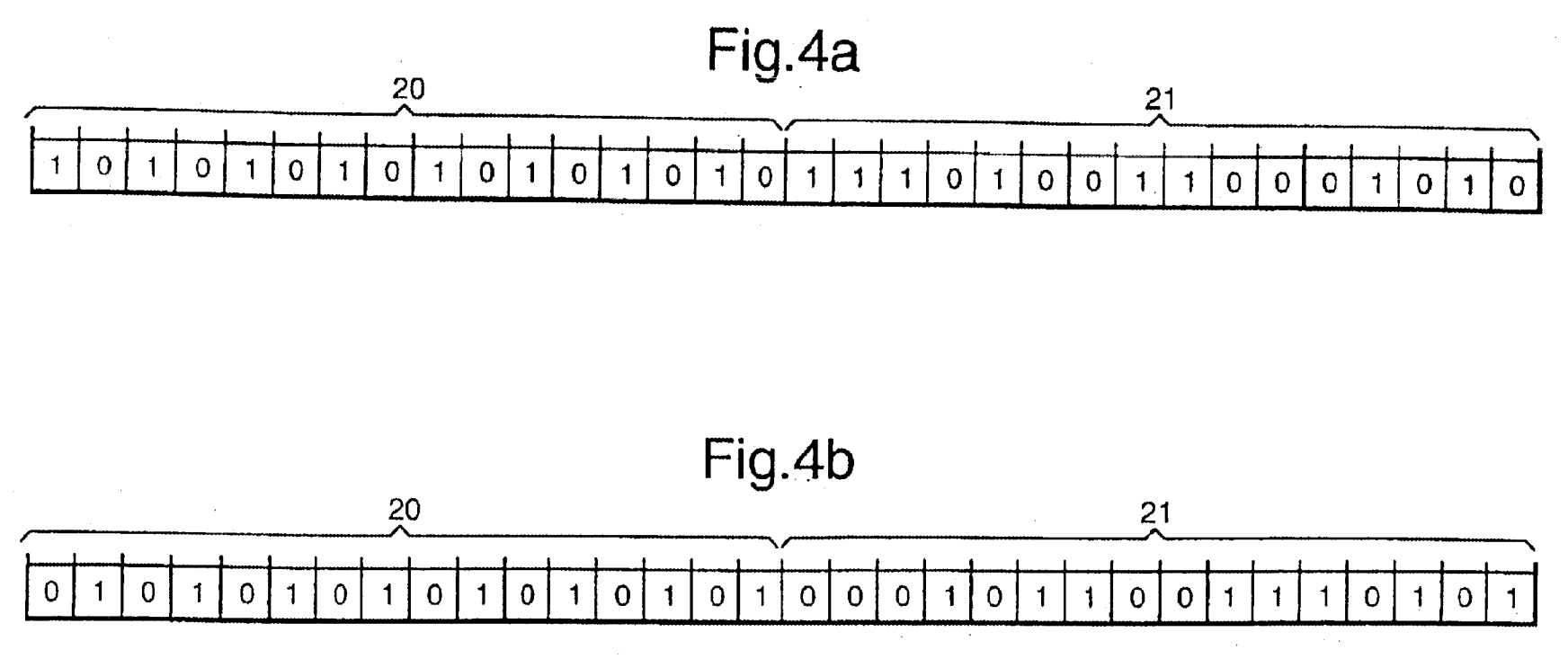

FIGS. 4a and 4b illustrate the two types of S-field utilised under the DECT standard. One is used in transmissions by the fixed part (FIG. 4a) and the other for transmission by the handset FIG. 4b. Both S-fields 11 are similar in that they include a preamble portion 20 used for 'lock' recovery, or bit synchronisation, and a synchronisation word 21 used for slot recovery. The preamble in each case is a sequence of zero/one transitions. If the synchronisation word detected is the known synchronisation word, bit synchronisation is confirmed and a known position within the burst has been established. The receiver uses the synchronisation word to locate the beginning of the A-field and the subsequent fields to obtain the information carried by the burst.

Lock recovery can be achieved in a number of ways, one of which is illustrated in FIG. 5. FIG. 5 shows a sequence in which two 2×9 bit banks 30, 31 are seen for successive over sample periods for nine times oversampling a received signal. The incoming bit stream is sampled 9 times and the over-sampled 1s and 0s are stored in a bank of shift registers. The contents of the bank are compared each oversampled clock cycle until the 0-1 or 1-0 transition falls at the junction between two the bit banks. When the banks contain respectively nine 0s and nine 1s the phase of the bit rate clock on the burst mode controller is shifted to comply with the phase of the clock cycle determined from the oversampling. This example uses nine times oversampling. Other oversampling rates could, however, be employed.

Under conditions of poor signal reception, it is not necessary for the banks to contain nine 0s and nine 1s. In order for lock recovery to still be achieved, a compromise will be necessary and lock recovery identified when say seven or more 1s and 0s are present in the central seven bits of the respective banks. Other criteria could, however, be chosen to establish the location of a zero/one transition. Under these conditions, however, location of a single zero/one transition will typically not be sufficient for lock recovery to be consistently achieved.

Figure 6:
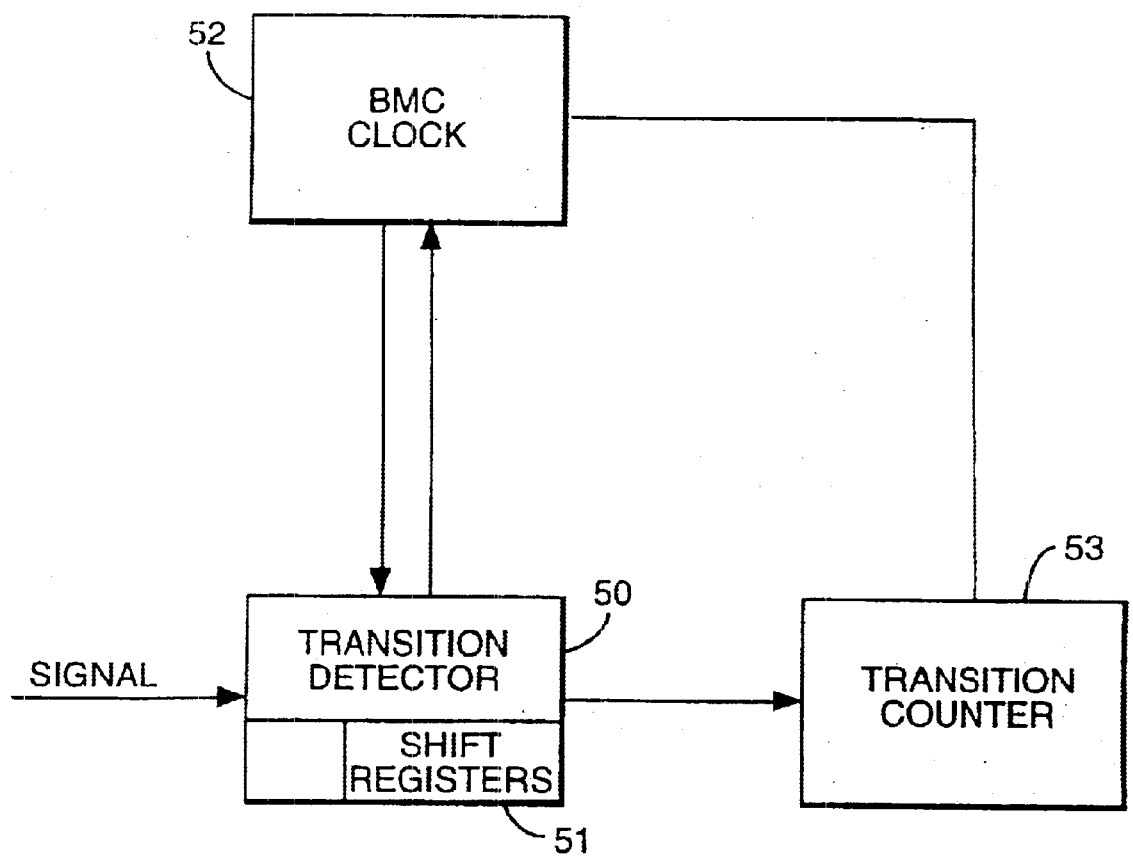
FIG. 6 is a schematic representation of apparatus for a lock recovery.

FIG. 6 shows an apparatus for determining a lock recovery point. FIG. 6 shows a transition detector 50 receiving an incoming burst. The transition detector contains shift registers 51 and detects a transition when the two bit banks 30, 31 register a transition as explained previously. When a transition is detected the phase of a clock 52 in the BMC is adjusted or reset. The number of zero-one transitions detected are counted by a transition counter 53. The transition counter 53 sends a signal to the BMC clock 52 to prevent it from being adjusted or reset further once a predetermined number of proper transitions have been identified by the transition detector 53.

Figure 7:
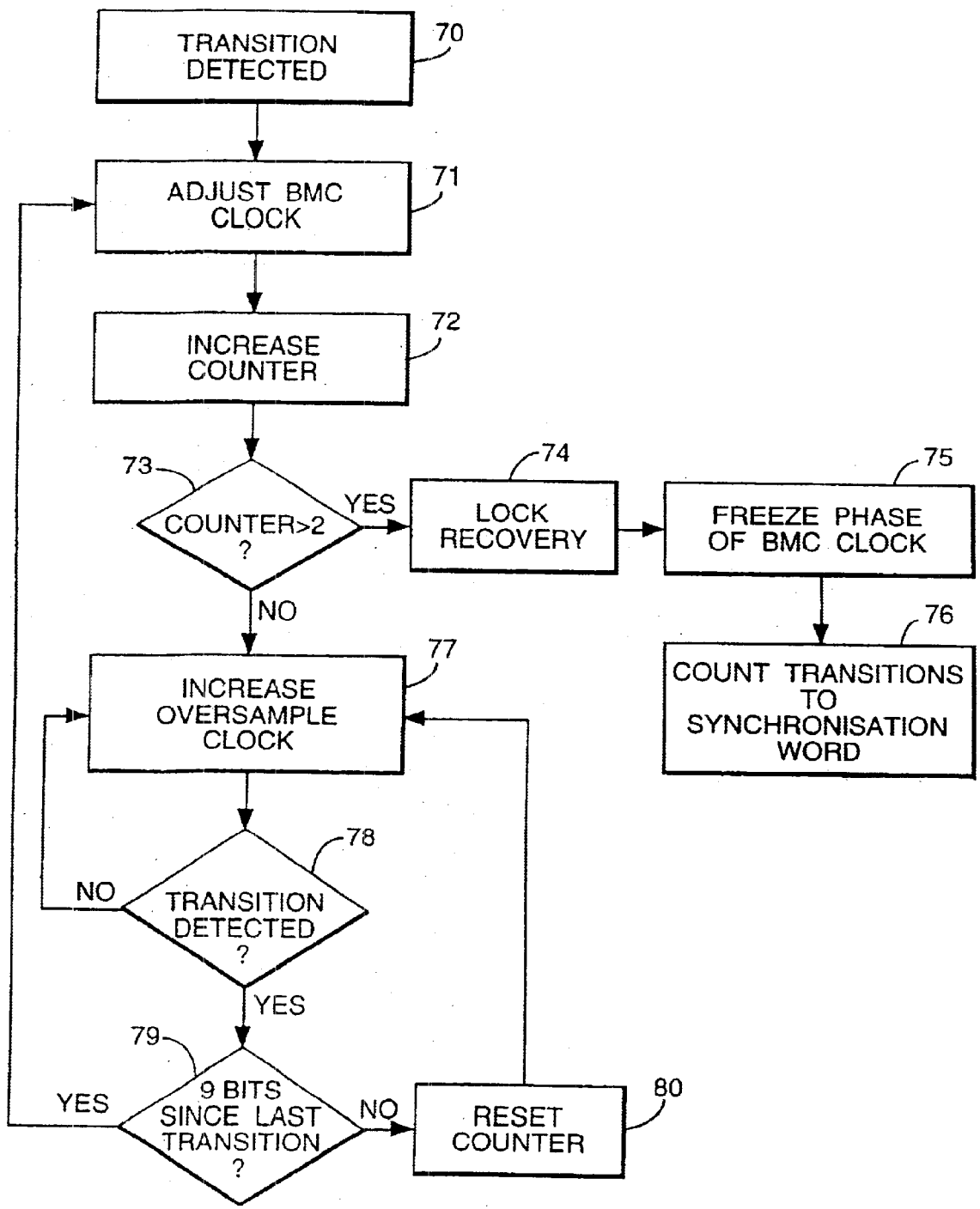
FIG. 7 is a flow chart illustrating operation of the apparatus of FIG. 6.

FIG. 7 is a flow chart describing operation of the apparatus of FIG. 6. Once the oversampled incoming signal is positioned in the bit banks 30,31 such that a 0-1 transition occurs at the junction of the two banks, a transition has been detected 70. When a transition is detected the BMC clock 52 is adjusted 71 and the counter 53 increased by one 72. If the counter registers more than two, 73 it means that this is the third successful transition that has been detected and lock recovery is deemed to have been achieved 74. The BMC clock 52 is frozen 75, ie no further adjustments are made to the phase of the clock which then remains the same for the duration of the received burst. The transition counter 53 then continues to count the number of transitions to the beginning of the synchronisation word 76. This can be achieved either by detecting the first 1-1 or 0-0 transition following the preamble depending on whether it is the base station or the handset that is receiving the burst and stopping the count at that stage. Alternatively the end of the synchronisation word could be detected and the number of counts to the beginning calculated by subtracting 16 bits from the end point. The number of bits to the synchronisation word can be determined in these or other ways. Other measures of the interval to the achievement of synchronisation could, instead, be employed.

If the counter does not register more than two, 73 the oversample clock is increased by one 77 until another transition is detected 78. A determination is then made as to whether there have been exactly nine oversample bits since the last transition 79. If there have, the BMC clock is adjusted 71, the counter increased and the process continued to detect the next transition. If not, the counter is reset 80, and the oversample clock increased 77 until the next transition is detected 78. Once lock recovery has been achieved, the number of bits to the synchronisation word can be counted.

By continuing to count the 0-1, 1-0 transitions until the synchronisation word is received, an indication of the ease with which bit synchronisation has been achieved is made. This can be used as a measure of the signal quality as it is easier to achieve lock recovery when a received signal is of good quality than when it is of poorer quality. The fewer transitions remaining to detection of the synchronisation word, the poorer the signal quality. By comparing the results achieved for successive bursts, deterioration or improvement in signal quality can also be monitored.

For example, if over a number of bursts the number of transitions between lock recovery and the synchronisation word are as follows:

8, 8, 7, 8, 8, 7, 8, 8, 7, 7, 7, 6, 6, 6, 5, 5

The increasing interval necessary to establish lock recovery indicates that perhaps the burst is undergoing a sliding collision eroding data at the front end of the burst.

Figure 8:
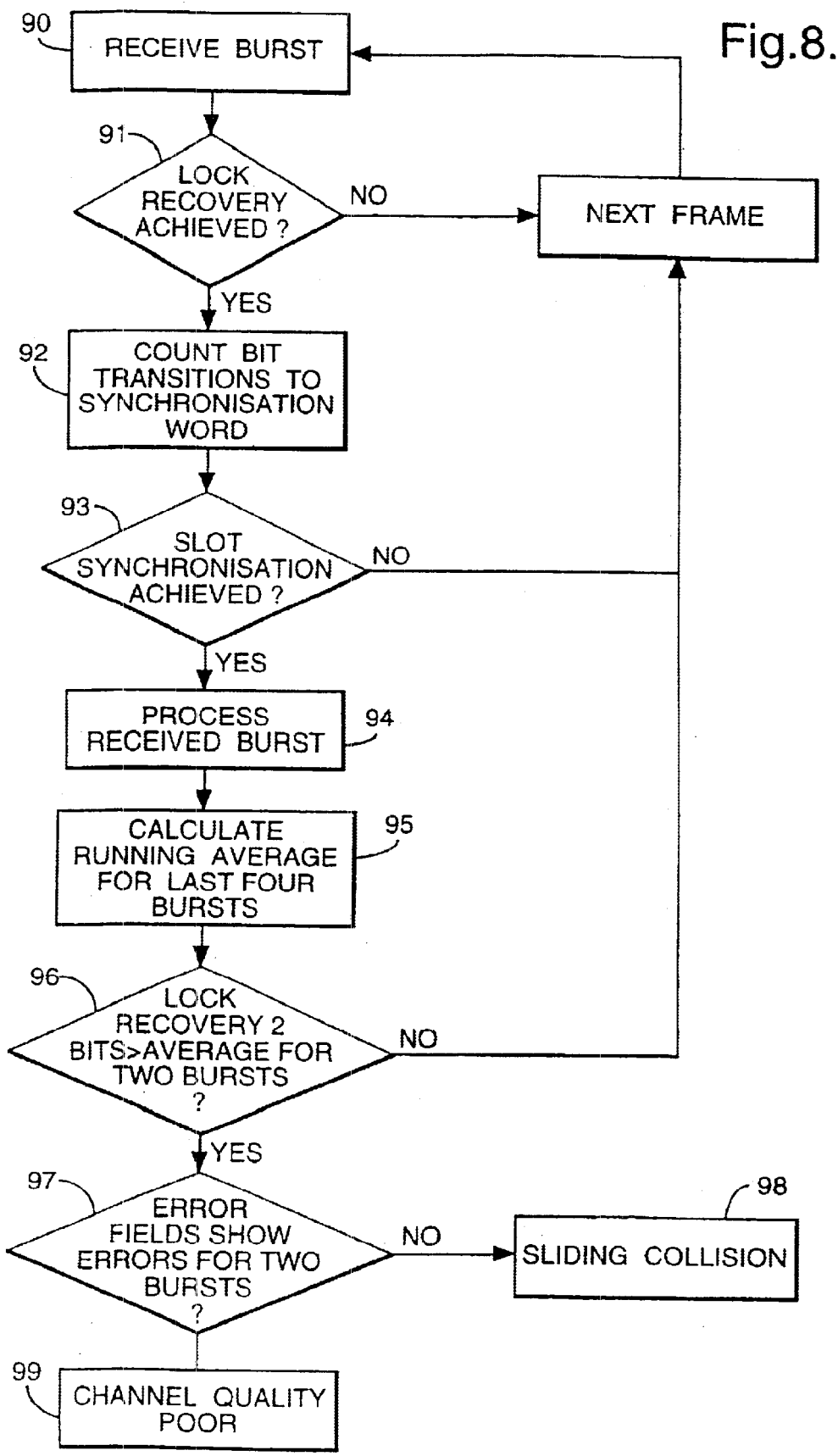
FIG. 8 is a flow chart illustrating an embodiment of the invention.

An example of how this information can be used as a measure of signal quality is illustrated in FIG. 8. On receiving a burst 90, the received signal is oversampled and a determination as to whether lock recovery has been achieved is made 91 by, for example, the method described in relation to FIG. 7. Once there is a determination that lock recovery has been made, the bit transitions are counted 92 until the beginning of the synchronisation word is identified. Once the synchronisation word has been processed the achievement of slot synchronisation can be verified 93 and the received burst processed 94. Once the lock recovery point has been identified a running average of the lock recovery point for the most recent four bursts, for example, can be calculated 95 and a comparison with the lock recovery point for the two most recent bursts is made 96. If lock recovery was achieved more than 2 bit transitions later than average for this burst and the previous burst it can be assumed that the quality of the received synchronisation field has deteriorated. Two bursts need to be considered in order to distinguish a sliding collision from the back end of a fast fade. No further hysterisis is necessary in detecting a sliding collision. So this provides an efficient way for detecting sliding collisions corrupting the synchronisation field of a burst.

Once a determination has been made that the lock recovery was more than two bits later than average, a check is made to see if one or more of the other error fields of the signal burst indicate an error in the received signal 97 for both the two most recent bursts. If no errors in the received signal are indicated, a determination that the burst is experiencing a sliding collision can be made 98 and a new channel selected for communication. If lock recovery has taken more than 2 bits longer than average for the two most recent bursts and the other error detection fields also show errors the information provided by the speed with which synchronisation was achieved is a further indication that the channel quality is poor 99. If the deterioration in quality of the synchronisation field causing lock recovery to be achieved more than two bits later than average for the two most recent bursts, is not the result of a sliding collision as errors are also detected in the CRCs, the channel can again determined to be of poor quality and handover can be requested. Thus the synchronisation field can be used simply as another error detection field.

If the synchronisation field is used as another error detection field the in-built hysterisis necessary for a determination that errors result from a permanent channel deterioration rather then fast fades or other temporary signal deteriorations will be necessary in order to prevent unnecessary handover as a result of fast fades or other temporary signal deteriorations. Suitable methods and apparatus for handing over are described in copending UK applications 9500799.3 and 9500619.3.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention. The invention is applicable for use in cordless systems under protocols other than DECT including Wireless Customer Premises Equipment (WCPE) and Personal Handyphone System (PHS) and it is not restricted to use in cordless systems.

What is claimed is:

1. A radio receiver for communication in a radio system in which information carried by an incoming signal is transmitted in bursts, a burst having a synchronization field with transitions in logic state for synchronization of the radio receiver with the incoming signal, the synchronization field being characterized by a preamble and a synchronization word following the preamble, the radio receiver including a detector for detecting logic-state transitions in the preamble to signal an achievement of the synchronization, and comprising a processor operable to monitor a spacing between the logic-state transitions for determining an interval between the achievement of synchronization and the inception of the synchronization word, the length of the interval serving as a measure of signal quality.

2. A radio receiver according to claim 1 for a system in which a burst is transmitted in a time slot and the burst further comprises a slot synchronisation string following the synchronisation field, wherein the interval for the achievement of synchronisation is determined from the interval between a determined synchronisation point and a predetermined point in the slot synchrorisation field.

3. A radio receiver according to claim 1 for a system in which a burst further comprises an error detection field wherein the processor is operable to utilise information from the error detection field to provide a further measure of signal quality.

4. A radio receiver according to claim 1 wherein the processor is operable to select another communication channel in response to a determination that signal quality falls below a predetermined quality threshold.

5. A radio receiver according to claim 3 wherein a determination that the signal falls below the predetermined threshold is made if the quality measure determined from the interval following the achievement of synchronization falls below a predetermined threshold and the measure of quality determined from the error detection field is above a predetermined quality threshold.

6. A radio receiver according to claim 1 wherein the radio receiver comprises a radio handset transceiver.

7. A method of operation of a radio handset for communication on a radio telephone system in which information carried by an incoming signal is transmitted in bursts, a burst having a synchronization field with transitions in logic state for synchronization of the handset with the incoming signal, the synchronization field being characterized by a preamble and a synchronization word following the preamble, the method comprising steps of detecting logic state transitions in the preamble to establish an achievement of the synchronization, and monitoring a spacing between the logic-state transitions for determining an interval between the achievement of synchronization and the inception of the synchronization word, the length of the interval serving as a measure of signal quality.

8. A communication device for communication in a radio system in which information is transmitted in bursts, a burst having a field enabling the communication device to synchronize with an incoming signal, the communication device comprising a processor operable to utilize the interval for the achievement of synchronization as a measure of signal quality;

wherein said processor includes means for obtaining a sequence of samples in an oversampling of pulses of a synchronization field of the incoming signal, and means for monitoring a spacing between transitions of logic state in said sample sequence, the occurrence of a plurality of said transitions with desired spacing being taken as a measure of signal quality.

9. A method of operation of a communication device for communication on a radio telephone system in which information is transmitted in bursts, a burst having a field for enabling synchronization with an incoming signal, the method comprising utilizing an interval for achievement of synchronization as a measure of signal quality;

wherein said utilizing step comprises steps of obtaining a sequence of samples in an oversampling of pulses of a synchronization field of the incoming signal, detecting transitions of logic state in the field, and monitoring a spacing between transitions in said sample sequence, the occurrence of a plurality of said transitions with desired spacing being taken as a measure of signal quality.

10. A communication device according to claim 8 wherein a monitoring by said monitoring means is accomplished by a counting of the number of pulses of said sample sequence occurring between said transitions.

11. A communication device according to claim 10 wherein said monitoring includes also a counting of transitions observed to occur after an occurrence of a predetermined number of the pulses of said sample sequence.

12. A method according to claim 9 wherein said monitoring includes a counting the number of pulses of said sample sequence occurring between said transitions.

13. A method according to claim 12 wherein said monitoring includes also a counting of transitions observed to occur after an occurrence of a predetermined number of the pulses of said sample sequence.

14. A device for communication in a system in which information carried by an incoming signal is transmitted in bursts, a burst having a synchronization field with transitions in logic state and characterized by a preamble and a synchronization word following the preamble for synchronization of the communication device with the incoming signal, the communication device including a detector for detecting logic-state transitions in the preamble to signal an achievement of the synchronization, and comprising a processor operable to monitor a spacing between the logic-state transitions for determining an interval between the achievement of synchronization and the inception of the synchronization word, the length of the interval serving as a measure of signal quality.

15. A method of operation of a device for communication on a system in which information carried by an incoming signal is transmitted in bursts, a burst having a synchronization field with transitions is logic state and characterized by a preamble and a synchronization word following the preamble for synchronization of the communication device with the incoming signal, the method comprising steps of detecting transitions of logic state in the synchronization field to signal an achievement of the synchronization, and monitoring a spacing between the logic-state transitions for determining an interval between the achievement of synchronization and the inception of the synchronization word, the length of the interval serving as a measure of signal quality.

* * * * *